US012639534B2

(12) United States Patent
Sung

(10) Patent No.: US 12,639,534 B2
(45) Date of Patent: May 26, 2026

(54) WEBTOON CONTENT MULTILINGUAL TRANSLATION METHOD

(71) Applicant: Kyung Jun Sung, Seoul (KR)

(72) Inventor: Kyung Jun Sung, Seoul (KR)

( * ) Notice: Subject to any disclaimer, the term of this patent is extended or adjusted under 35 U.S.C. 154(b) by 186 days.

(21) Appl. No.: 18/575,883

(22) PCT Filed: Jul. 1, 2022

(86) PCT No.: PCT/KR2022/009560
§ 371 (c)(1),
(2) Date: Jan. 30, 2024

(87) PCT Pub. No.: WO2023/277667
PCT Pub. Date: Jan. 5, 2023

(65) Prior Publication Data
US 2024/0338535 A1      Oct. 10, 2024

(30) Foreign Application Priority Data
Jul. 2, 2021      (KR) ........................ 10-2021-0087316

(51) Int. Cl.
G06F 40/58          (2020.01)
G06T 11/60          (2006.01)
*G06F 40/109*         (2020.01)

(52) U.S. Cl.
CPC .............. G06F 40/58 (2020.01); G06T 11/60 (2013.01); *G06F 40/109* (2020.01)

(58) Field of Classification Search
None
See application file for complete search history.

(56) References Cited

U.S. PATENT DOCUMENTS

| | | | | |
|---|---|---|---|---|
| 10,402,699 B1* | 9/2019 | Chen | .......................... | G06T 3/40 |
| 2010/0110080 A1* | 5/2010 | Goodinson | ............. | G06T 11/60 |
| | | | | 345/467 |

(Continued)

FOREIGN PATENT DOCUMENTS

| | | | |
|---|---|---|---|
| KR | 20100045337 A | 5/2010 |
| KR | 20160071300 A | 6/2016 |

(Continued)

OTHER PUBLICATIONS

Kim, Young-Min. Feature visualization in comic artist classification using deep neural networks. Journal of Big Data (2019). vol. 6, Article No. 56, pp. 1-18, Jun. 25, 2019.

(Continued)

*Primary Examiner* — Shaun Roberts
(74) *Attorney, Agent, or Firm* — NKL Law; Jae Youn Kim

(57) ABSTRACT

Provided relates to a method for translating webtoon content in various languages, and provided is configured by including the steps of: (a) training a speech bubble recognition algorithm using artificial intelligence, so as to determine a speech bubble region of a webtoon image; (b) determining a speech bubble region of a webtoon image to be determined by using the trained speech bubble recognition algorithm; (c) extracting original text of the determined speech bubble region; (d) translating the extracted original text; (e) adjusting a font, a size, and a space between letters of translated text according to the determined speech bubble region; and (f) generating a translation image by replacing the original text in the speech bubble region with the adjusted translated text, and thus there is an effect of translating, in real time, webtoon text in a language of a country desired by a consumer and providing same.

11 Claims, 6 Drawing Sheets

(56)                    References Cited

U.S. PATENT DOCUMENTS

| | | | | |
|---|---|---|---|---|
| 2013/0104016 A1* | 4/2013 | Nonaka | ............... | G06F 40/106 |
| | | | | 715/204 |
| 2015/0302617 A1* | 10/2015 | Shimura | .............. | G06T 11/203 |
| | | | | 345/441 |
| 2017/0083511 A1* | 3/2017 | Hartrell | .................. | G06N 3/084 |
| 2017/0365083 A1* | 12/2017 | Hartrell | ................ | G06F 18/214 |
| 2020/0226387 A1* | 7/2020 | Park | .................... | G06V 40/172 |
| 2021/0407205 A1* | 12/2021 | Canberk | ................ | G10L 15/26 |

FOREIGN PATENT DOCUMENTS

| | | |
|---|---|---|
| KR | 102024179 B1 | 9/2019 |
| KR | 20190121127 A | 10/2019 |

OTHER PUBLICATIONS

Christian Roggia et al. "Extraction of Frame Sequences in the Manga Context" 2020 IEEE International Symposium on Multimedia, IEEE Xplore Dec. 2, 2020, pp. 96-99.

* cited by examiner

S200

DISTINGUISH SPEECH BUBBLE REGION FROM WEBTOON IMAGE TO BE DETERMINED — S210

EXTRACT ORIGINAL TEXT IN DISTINGUISHED SPEECH BUBBLE REGION — S220

TRANSLATE ORIGINAL TEXT — S230

ADJUST TRANSLATED TEXT — S240

GENERATE TRANSLATED IMAGE — S250

WEBTOON CONTENT MULTILINGUAL TRANSLATION METHOD

TECHNICAL FIELD

The present invention relates to a webtoon content multilingual translation method, and more particularly to a method of learning various types of speech bubbles for each webtoon author through artificial intelligence, thereby accurately and quickly distinguishing the speech bubbles and translating the text in the speech bubbles into the language of a county desired by a consumer.

BACKGROUND ART

With the development of the Internet, a variety of media content, including comics, is being enjoyed around the world, and with this trend, the demand for services that convert content produced in a specific language into various languages is increasing.

In recent years, Korea's diverse and abundant webtoons have been experiencing explosive growth in demand around the world, thanks to the influence of the Korean wave, K-pop, etc.

In order to make Korean webtoon content available to overseas consumers, content providers have mainly been using a method of manually translating the text of the content through professional translators and overlaying the translated text on the original image in order to modify the content before distributing the same.

This conventional manual method requires a large investment in terms of time and cost, and therefore, in recent years, a method of recognizing speech bubbles in the original image and automatically translating the text therein is mainly used, which requires a process of recognizing speech bubbles in the original image first.

However, conventional recognition of a speech bubble region is generally determined based on the presence or absence of text, and in this case, there was a problem that the webtoon image was damaged when the translated text was overwritten on the original text because the speech bubble region was not accurately recognized, and there was a problem that characters, such as characters representing background sounds drawn on a background image, were mistakenly recognized as speech bubbles.

The reason for this is that speech bubbles used in webtoons have various shapes as shown in FIG. 1 and the background color of the speech bubble and the text color are also expressed in various ways and cannot be normalized, making it difficult to accurately recognize the speech bubble region.

Therefore, there is a need for a technology capable of accurately recognizing speech bubble regions having such various shapes and colors using an automated computer program.

DISCLOSURE

Technical Problem

The present invention has been made in view of the above conventional problems, and it is an object of the present invention to provide a method of accurately and quickly recognizing speech bubbles that exist in various forms on webtoon images in order to translate webtoon text into different languages.

Technical Solution

In an aspect of the present invention to accomplish the above object, a webtoon content multilingual translation method includes (a) training a speech bubble recognition algorithm using artificial intelligence in order to distinguish a speech bubble region in a webtoon image, (b) distinguishing a speech bubble region from a webtoon image to be determined using the trained speech bubble recognition algorithm, (c) extracting the original text in the distinguished speech bubble region, (d) translating the extracted original text, (e) adjusting the font, size, and space between letters of the translated text so as to correspond to the distinguished speech bubble region, and (f) replacing the original text image in the speech bubble region with the adjusted translated text to generate a translated image.

In an embodiment of the webtoon content multilingual translation method, step (a) may include (a1) crawling a webtoon image for learning from a webtoon server and storing the crawled webtoon image in a database of a service provision server, (a2) processing the stored learning image, and (a3) learning a speech bubble region through a speech bubble recognition algorithm using an artificial neural network.

In addition, step (a2) of processing the learning image may include blackening or normalizing the image in order to minimize the difference in webtoon style.

In addition, step (a2) of processing the learning image may include setting the maximum value and the minimum value for the thickness of a closed curved line segment on the image to correct the closed curved line segment.

In addition, learning the speech bubble region through the speech bubble recognition algorithm in step (a3) may be performed by (a31) extracting a closed curve included in the webtoon image, (a32) dividing the closed curve into unit lengths, (a33) transforming the unit-length curves into vectors, and (a34) learning transformed values of the successive vectors.

In learning the speech bubble region through the speech bubble recognition algorithm in step (a3), a weight may be given depending on whether the text included in the closed curve region is recognized or not.

Also, in learning the speech bubble region through the speech bubble recognition algorithm in step (a3), a weight may be given depending on the degree of matching of vector change with a regular model closed curve stored in the database.

In addition, the regular model closed curve may include a speech bubble model constituted by a basic model of a speech bubble closed curve and a frame model constituted by outline basic models configured to separate webtoon frames from each other, and in step (a3), the weight may be given such that the higher the match with the speech bubble model, the higher the weight, and the higher the match with the frame model, the lower the weight.

In addition, the webtoon image to be determined may be provided in a set of images for each work, and steps (b) to (f) may be sequentially repeatedly performed for images included in the set of images.

In addition, when a process of distinguishing a speech bubble region for one image included in the set of images has been performed, an algorithm correction step of giving an author characteristic weight to the speech bubble recognition algorithm depending on the rate of change of a closed curve vector constituting the distinguished speech bubble region may be further performed.

In addition, the author characteristic weight may be initialized when author information of the webtoon image to be determined is changed.

In step (d) of translating the original text, the text may be individually recognized for each recognized speech bubble and may be translated into a predetermined language.

In addition, step (f) of generating the translated image may be performed such that the adjusted translated text is converted into an image file and a speech bubble region of the original image is overwritten with the same.

Advantageous Effects

The present invention having the above configuration has the effect of training a speech bubble recognition algorithm using an artificial neural network of artificial intelligence, whereby it is possible to accurately and quickly recognize various types of speech bubbles in webtoon images.

In addition, the present invention has the effect of minimizing the difference in webtoon style by processing an image of a speech bubble using a blackening or normalization method such that the speech bubble recognition algorithm can further take into account the features of the speech bubble, whereby it is possible for an artificial intelligence algorithm to more easily recognize the speech bubble.

In particular, the present invention has the effect of giving a weight to the speech bubble recognition algorithm for each webtoon author, whereby it is possible for the artificial intelligence algorithm to more accurately and quickly recognize speech bubble.

Furthermore, the present invention has the effect of providing webtoon images translated in a desired language in real time upon user request without storing pre-translated webtoon images through quick and accurate speech bubble translation as described above.

BEST MODE

Figure 1:
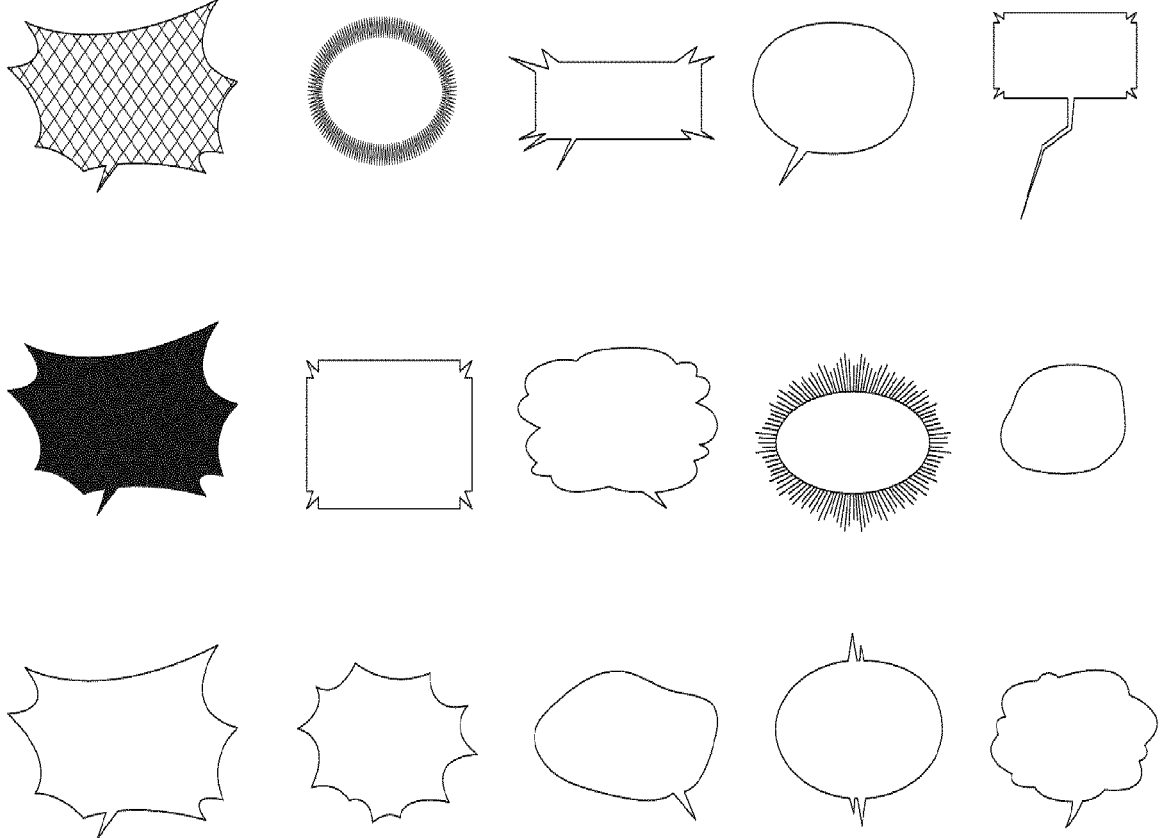
FIG. 1 is an illustrative view showing various types of speech bubbles disclosed in a webtoon.

According to a preferred embodiment of the present invention, the present invention includes:

(a) training a speech bubble recognition algorithm using artificial intelligence in order to distinguish a speech bubble region in a webtoon image;

(b) distinguishing a speech bubble region from a webtoon image to be determined using the trained speech bubble recognition algorithm;

(c) extracting an original text in the distinguished speech bubble region;

(d) translating the extracted original text;

(e) adjusting the font, size, and space between letters of the translated text so as to correspond to the distinguished speech bubble region; and (f) replacing the original text image in the speech bubble region with the adjusted translated text to generate a translated image, wherein step (a) includes:

(a1) crawling a webtoon image for learning from a webtoon server and storing the crawled webtoon image in a database of a service provision server;

(a2) processing the stored learning image; and (a3) learning a speech bubble region through a speech bubble recognition algorithm using an artificial neural network.

Accordingly, the present invention has the effect of accurately and quickly recognizing various types of speech bubbles in webtoon images by training a speech bubble recognition algorithm using an artificial neural network of artificial intelligence.

MODE FOR INVENTION

The present invention may be changed in various manners and may have various embodiments, wherein specific embodiments will be described in detail with reference to the drawings. However, the present invention is not limited to the specific embodiments, and it should be understood that the present invention includes all modifications, equivalents, or substitutions included in the idea and technical scope of the present invention. In describing the present invention, a detailed description of known configurations incorporated herein will be omitted when the same may obscure the subject matter of the present invention.

Although terms, such as "first" and "second," may be used herein to describe various elements, the elements should not be limited by the terms. The terms are only used to distinguish one element from another element.

The terms used in the present application are provided only to described specific embodiments, and do not limit the present invention. Singular forms are intended to include plural forms as well, unless the context clearly indicates otherwise. In the present application, it should be understood that the terms "includes," "has," etc. specify the presence of stated features, numbers, steps, operations, elements, components, or combinations thereof, but do not preclude the presence or addition of one or more other features, numbers, steps, operations, elements, components, or combinations thereof.

The present invention relates to a method of training a speech bubble recognition algorithm using an artificial neural network of artificial intelligence, thereby accurately and quickly recognizing various types of speech bubbles in webtoon images, translating the text in the speech bubbles into various languages in real time, and providing the same to a user.

Figure 2:
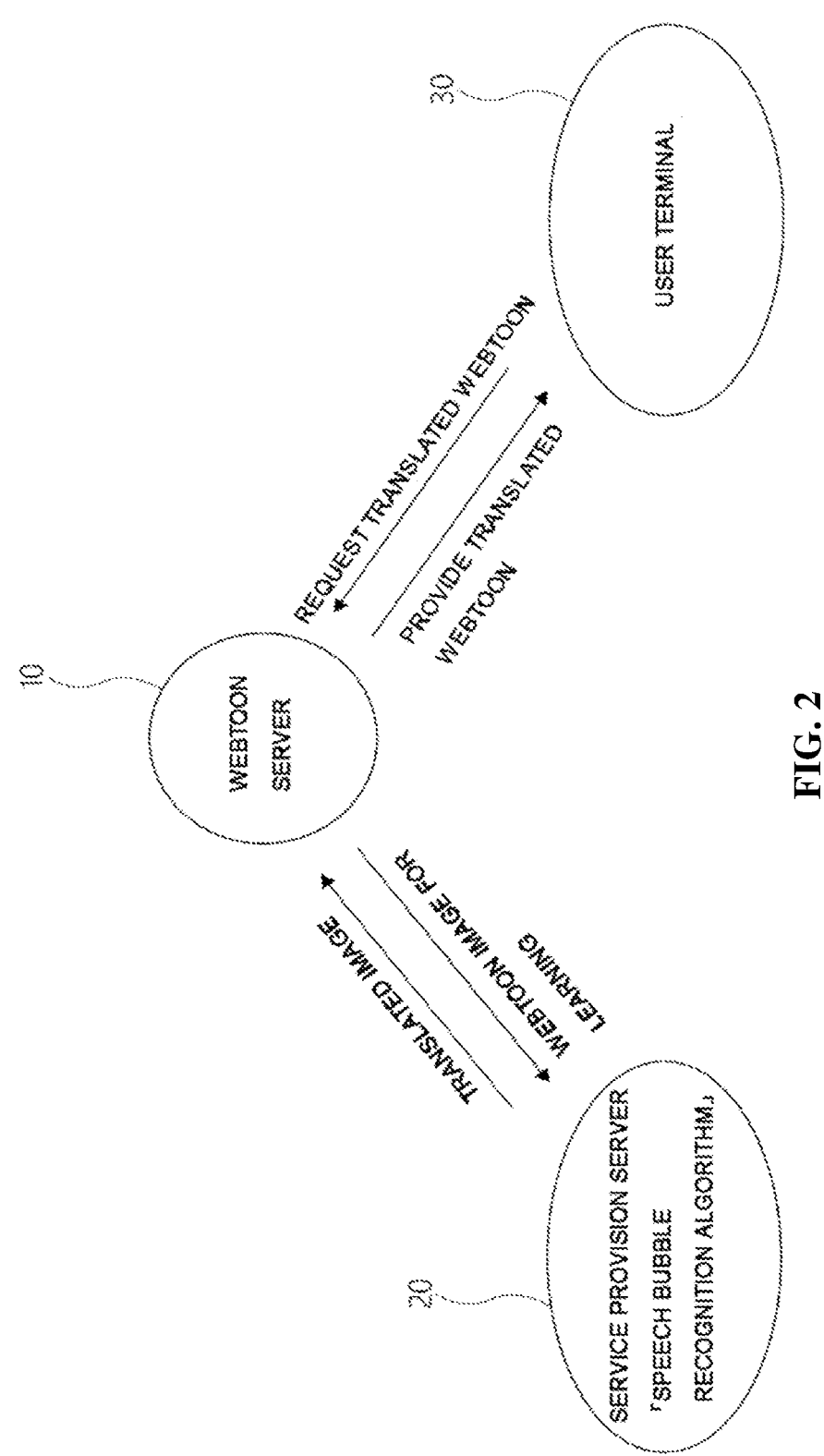
FIG. 2 is a conceptual view showing a computer system for implementing a method according to the present invention.
Figure 3:
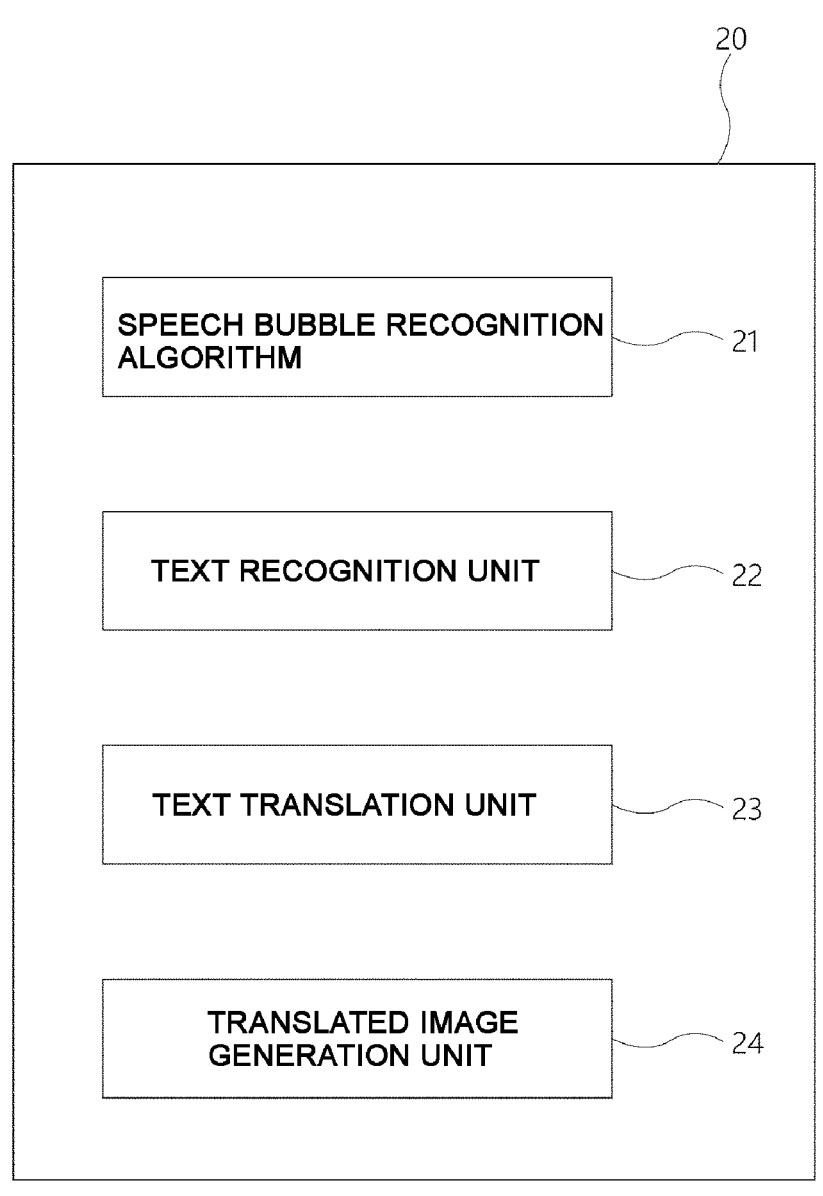
FIG. 3 is a configuration diagram of a service provision server applied to the computer system.
Figure 4:
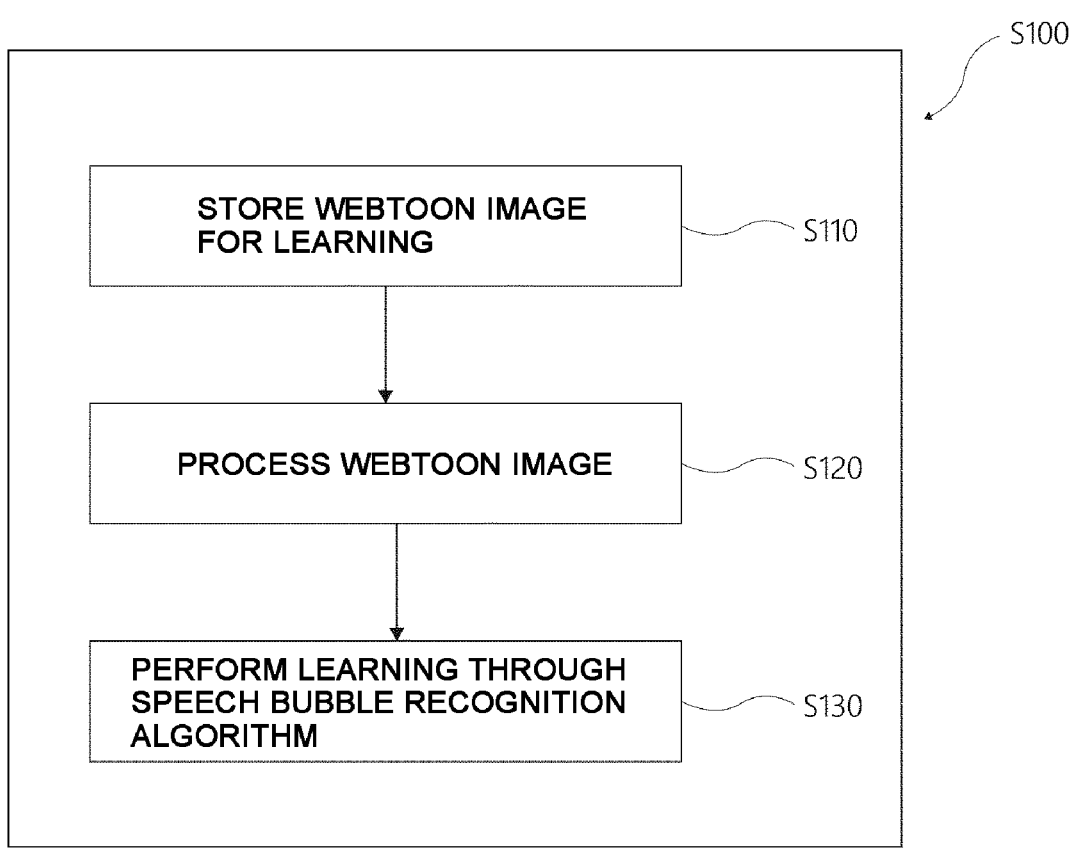
FIG. 4 is a block diagram showing a sequence of steps of learning speech bubble region characteristics using artificial intelligence according to the present invention.
Figure 5:
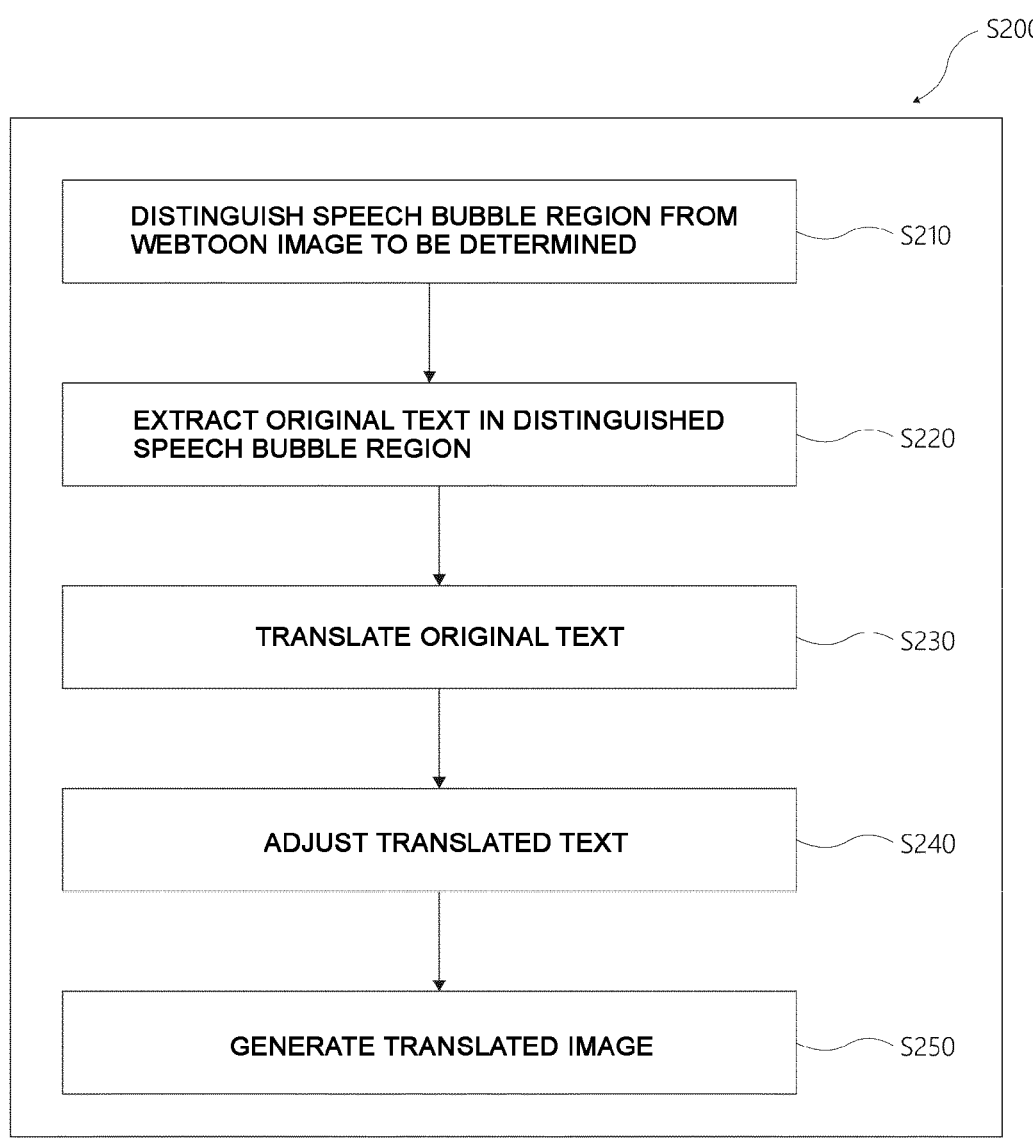
FIG. 5 is a block diagram showing a sequence of steps after the steps in FIG. 4.
Figure 6:
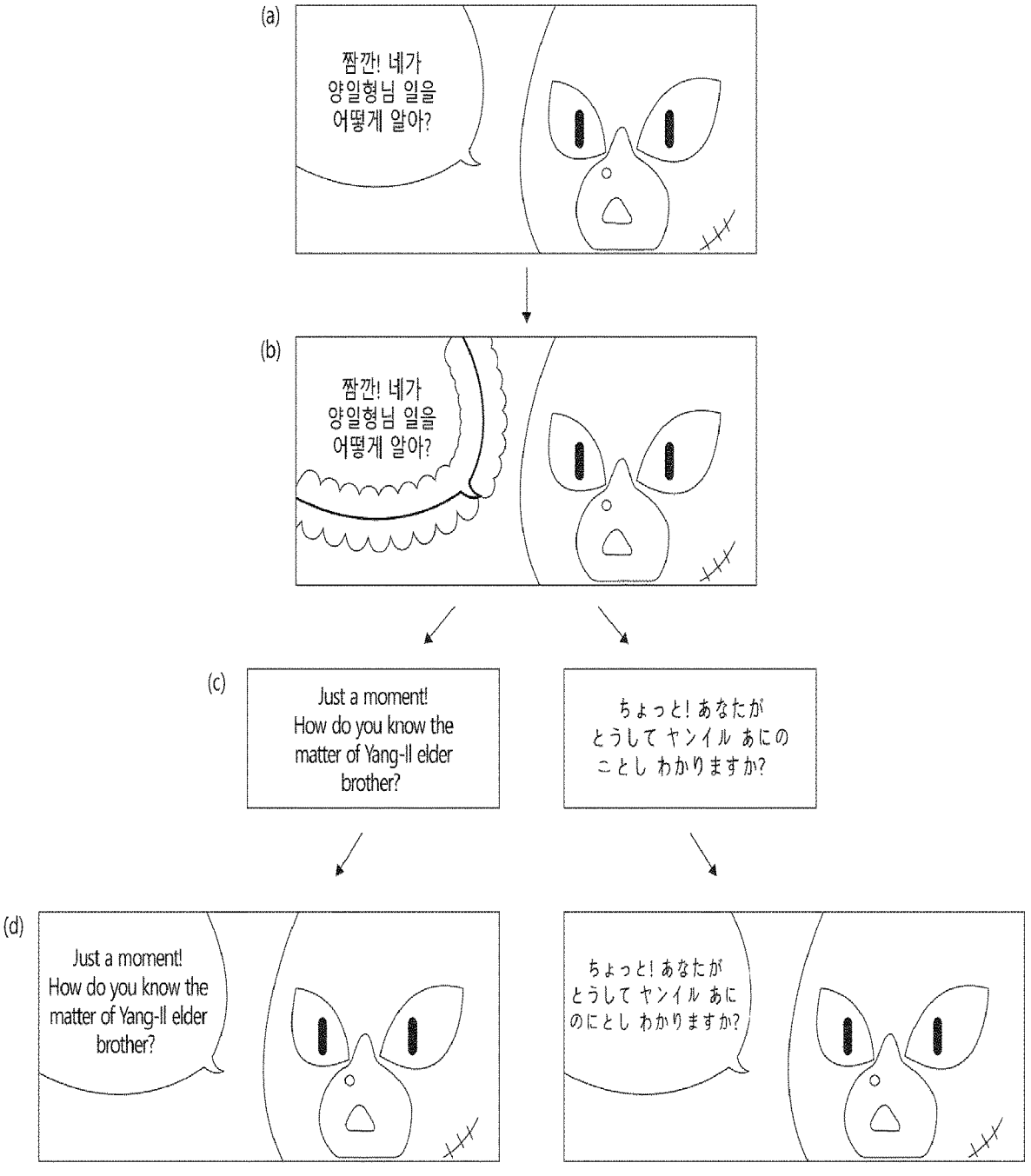
FIG. 6 is an illustrative view showing an embodiment of a webtoon content translation method according to the present invention.

Hereinafter, a preferred embodiment of a webtoon content multilingual translation method according to the present invention will be described in more detail with reference to the accompanying drawings. In this regard, FIG. 2 is a conceptual view showing a computer system for implementing a method according to the present invention, FIG. 3 is a configuration diagram of a service provision server applied to the computer system, FIG. 4 is a block diagram showing a sequence of steps of learning speech bubble region characteristics using artificial intelligence according to the present invention, FIG. 5 is a block diagram showing a sequence of steps after the steps in FIG. 4, and FIG. 6 is an illustrative view showing an embodiment of a webtoon content translation method according to the present invention.

Referring to FIGS. 2 to 6, the webtoon content multilingual translation method according to the present invention broadly includes a step (S100) of training a speech bubble recognition algorithm using artificial intelligence, a step (S210) of distinguishing a speech bubble region using the trained speech bubble recognition algorithm, and steps (S220 to 250) of extracting and translating the original text in the distinguished speech bubble region.

In the present invention, the above process may be performed by a computer system including a webtoon server 10, a service provision server 20, and a user terminal 30. The webtoon server 10 supplies webtoon images for learning to the service provision server 20, receives translated webtoon images from the service provision server 20, and provides translated webtoon images to the user terminal 30 in real time when there is a request for a translated webtoon from the user terminal 30.

In the present invention, the step (S100) of training the speech bubble recognition algorithm, which is a preliminary step for distinguishing a speech bubble region of a webtoon image, may include a step (S110) of crawling a webtoon image for learning from the webtoon server and storing the same in a database of the service providing server, a step (S120) of processing the stored learning image, and a step (S130) of learning the speech bubble region through a speech bubble recognition algorithm using an artificial neural network.

Crawling is a computer software technique that involves visiting webpages on the Internet to collect data. In order to train the speech bubble recognition algorithm, as many webtoon images for learning as possible are needed, and since it is nearly impossible for people to sort and collect a huge number of web documents one by one, the crawling technique is used for web document retrieval.

Of course, it is also possible for storage of the webtoon images for learning to be performed by an administrator. That is, if a service provider already has a large number of webtoon images, the webtoon images may be utilized as webtoon images for artificial intelligence learning.

The step of processing the stored learning image (S120) refers to a preprocessing step that performs a kind of processing on the collected webtoon images for learning in order to make it easier for the artificial intelligence algorithm to recognize the features of the speech bubble region.

In the present invention, the step (S120) of processing the learning image may include blackening or normalizing the image in order to minimize the difference in webtoon style between webtoon platforms. Here, the webtoon platform refers to an operating system on the Internet that is the basis for uploading various webtoons.

In addition, the processing step may include a step of setting a threshold at which the artificial intelligence algorithm can focus more on the shape, color, thickness, etc. of the speech bubble such that the artificial intelligence algorithm can further take into account the features of the speech bubble. For example, the processing step may include a process of setting the maximum value and the minimum value for the thickness of a closed curved line segment on the webtoon image to correct the closed curved line segment.

Subsequently, a speech bubble region in the webtoon image processed as described above is learned through the speech bubble recognition algorithm using the artificial neural network (S130). The artificial neural network is a learning algorithm based on the operating principle of neurons, which is a known technique, and therefore a detailed description thereof will be omitted.

In the present invention, in learning of the speech bubble region through the speech bubble recognition algorithm, a closed curve included in the webtoon image is extracted first, and the extracted closed curve is divided into unit lengths. Subsequently, the divided unit-length curves are transformed into a vector function, and the features of the speech bubble region in the webtoon are learned by learning the transformed values of successive vectors.

Meanwhile, since it is common for text to be written in the speech bubble region, in learning of the speech bubble region through the speech bubble recognition algorithm according to the present invention, a weight may be given depending on whether the text included in the closed curve region is recognized or not. That is, if the text is included in the closed curve, which means that there is a high probability of corresponding to a speech bubble, a weight may be given thereto accordingly.

Also, in learning of the speech bubble region through the speech bubble recognition algorithm, a weight may be given depending on the degree of matching of vector change with a regular model closed curve stored in the database.

That is, the closed curve region in the webtoon image may be formed not only by the speech bubble, but also by a frame separating each scene of the webtoon. According to the present invention, therefore, the regular model closed curve may include a speech bubble model constituted by a basic model of a speech bubble closed curve and a frame model constituted by outline basic models configured to separate webtoon frames from each other, and a weight may be given such that the higher the match with the speech bubble model, the higher the weight, and the higher the match with the frame model, the lower the weight.

Here, the basic model of the speech bubble closed curve refers to a closed curve having various shapes as shown in FIG. 1 located in a frame of each scene of the webtoon, and the outline basic model refers to an outline for distinguishing each scene of the webtoon.

According to the present invention, therefore, a higher weight may be given to a closed curve similar to the speech bubble, whereby it may be possible to more accurately and quickly recognize the speech bubble region.

Hereinafter, a service for recognizing a speech bubble region of a webtoon image to be determined and providing a translated image is performed using the speech bubble recognition algorithm trained as described above.

That is, in the present invention, when a webtoon translation request is received from a user, a process of generating a translated image for the requested webtoon image is initiated. At this time, translation of webtoon images is requested by unit bundle, wherein the unit bundle refers to webtoon images collected by episode, book, or work of a specific webtoon. In order to generate the webtoon image, the service provider server first distinguishes a speech bubble region included in the webtoon image through the trained speech bubble recognition algorithm.

Meanwhile, it is common for webtoons to have a preferred form of speech bubble for each author, and the preferred form of speech bubble background color and text font color also varies for each author.

For example, some writers prefer black text on a white background, and others prefer white text on a black background.

Therefore, the present invention is characterized in that an author characteristic weight is given to the speech bubble recognition algorithm as the speech bubble recognition algorithm performs a speech bubble region distinguishing process when recognizing a speech bubble region of a webtoon image by unit bundle.

That is, the present invention is characterized in that the webtoon images to be determined are provided in a set of images for each work as described above, and when the speech bubble region distinguishing process (S210), the original text extraction process (S220), and the translation process (S230) are sequentially repeatedly performed for images included in the set of images, if the speech bubble region distinguishing process has been performed for one image included in the set of images, the speech bubble recognition algorithm is corrected by successively giving a weight (hereinafter referred to as an "author characteristic weight") to the speech bubble recognition algorithm depending on the rate of change of the closed curve vector constituting the distinguished speech bubble region.

That is, since each webtoon author has a preferred speech bubble shape, the characteristics of the rate of change of the closed curve vector constituting the speech bubble region are different for each author. Therefore, when the speech bubble region distinguishing process has been performed on an image, if the rate of change of the closed curve vector constituting the distinguished speech bubble region is close to a specific vector change rate, more accurate distinguishing of the speech bubble is possible for each webtoon author by giving a weight to the same.

At this time, the author characteristic weight is initialized when author information of the webtoon image to be determined is changed. At this time, the author information may be provided separately for each webtoon image requested for translation, and may be determined based on whether the webtoon has changed.

After distinguishing the speech bubble region as described above (S210), the original text of the distinguished speech bubble region is extracted and a translation process is performed (S220 to S230). The original text translation step (S230) is performed by a text translation unit 23 of the service provision server 20, which recognizes the text individually for each recognized speech bubble and translates the same into a predetermined language. At this time, the translation process may be performed in real time using an automated web translation service (Google Translate, Papago, etc.).

At this time, the number of words in the translated text may not coincide with the number of words in the original text due to the language characteristics of each country. According to the present invention, therefore, a step (S240) of adjusting the font, size, and space between letters of the translated text so as to correspond to the distinguished speech bubble region is performed, and then a translated image is generated by replacing the original text image in the speech bubble region with an image including the adjusted translated text (S250).

In the present invention, the step of generating the translated image (S250) may be performed by a translated image generation unit of the service provision server, which may convert the adjusted translated text into an image file as described above and may overwrite the speech bubble region of the original image with the same.

According to the present invention, therefore, it is possible to identify speech bubbles in webtoon images instantaneously (0.5 seconds for about 100 speech bubbles in 40 cuts of 1 episode) by learning various speech bubbles for each author that cannot be captured by existing computer programs due to various shapes and colors through the artificial intelligence algorithm and to provide translated webtoon images in real time when a user requests webtoon translation.

Although the preferred embodiment of the present invention has been described above, a person having ordinary skill in the art to which the present invention pertains will be able to make various modifications and changes to the present invention by adding, changing, or deleting elements without departing from the idea of the present invention described in the appended claims, which will also be said to be within the scope of the rights of the present invention.

For example, each element described in a singular form may also be implemented in a distributed form, and similarly, elements described as distributed may also be implemented in a combined form. The scope of the present invention is defined by the following claims rather than by the detailed description above, and the meaning and scope of the claims and all modifications or variations derived from the equivalents thereto are to be construed as being within the scope of the present invention.

INDUSTRIAL APPLICABILITY

The present invention relates to a method of translating webtoon content into various languages, and according to the present invention, it is possible to learn various types of speech bubbles for each webtoon author through artificial intelligence, whereby it is possible to accurately and quickly distinguish the speech bubbles, to translate the text in the speech bubbles into the language of a county desired by a consumer in real time, and to provide the same to the consumer.

The invention claimed is:

1. A webtoon content multilingual translation method comprising:
   (a) training a speech bubble recognition algorithm using artificial intelligence;
   (b) distinguishing a speech bubble region from a webtoon image to be determined using the trained speech bubble recognition algorithm;
   (c) extracting an original text in the distinguished speech bubble region;
   (d) translating the extracted original text;
   (e) adjusting a font, size, and space between letters of the translated text so as to correspond to the distinguished speech bubble region;
   (f) generating a translated image by replacing the original text in the speech bubble region with the adjusted translated text;
   (g) when the distinguishing of the speech bubble region in step (b) is performed for the webtoon image that is one of a set of webtoon images associated with an author, correcting the speech bubble recognition algorithm by applying an author characteristic weight determined based on a rate of change of a closed curve vector defining a boundary of the speech bubble region distinguished in the webtoon image; and
   (h) using the corrected speech bubble recognition algorithm to distinguish another speech bubble region in the set of webtoon images associated with the author.

2. The webtoon content multilingual translation method according to claim 1, wherein step (a) comprises:
   (a1) crawling a webtoon image for learning from a webtoon server and storing the crawled webtoon image in a database of a service provision server;
   (a2) processing the stored webtoon image; and (a3) learning the speech bubble region through the speech bubble recognition algorithm using an artificial neural network.

3. The webtoon content multilingual translation method according to claim 2, wherein step (a2) of processing the stored webtoon image comprises blackening or normalizing the stored webtoon image in order to minimize a difference in a webtoon style.

4. The webtoon content multilingual translation method according to claim 2, wherein step (a2) of processing the stored webtoon image comprises setting a maximum value and a minimum value for a thickness of a closed curved line segment on the stored webtoon image to correct the closed curved line segment.

5. The webtoon content multilingual translation method according to claim 2, wherein the learning of the speech bubble region through the speech bubble recognition algorithm in step (a3) is performed by:

(a31) extracting a closed curve included in the stored webtoon image;

(a32) dividing the closed curve into unit-length curves;

(a33) transforming the unit-length curves into vectors; and (a34) learning changes in values of successive vectors obtained in step (a33).

6. The webtoon content multilingual translation method according to claim 2, wherein, in the learning of the speech bubble region through the speech bubble recognition algorithm in step (a3), a weight is given depending on whether a text included in a closed curve region is recognized or not.

7. The webtoon content multilingual translation method according to claim 2, wherein, in the learning of the speech bubble region through the speech bubble recognition algorithm in step (a3), a weight is given depending on a degree of matching of a vector change with a regular model closed curve stored in the database.

8. The webtoon content multilingual translation method according to claim 7, wherein the regular model closed curve comprises:

a speech bubble model including a basic model of a speech bubble closed curve; and a frame model including an outline basic model configured to separate webtoon frames from one another, and wherein in step (a3), the weight is given such that the higher a match with the speech bubble model, the higher the weight, and the higher a match with the frame model, the lower the weight.

9. The webtoon content multilingual translation method according to claim 1, wherein the webtoon image to be determined is provided in a set of webtoon images for each work, and steps (b) to (f) are sequentially and repeatedly performed for webtoon images included in the set of webtoon images.

10. The webtoon content multilingual translation method according to claim 1, wherein, in the translating of the original text in step (d), the text is individually recognized for each distinguished speech bubble region and is translated into a predetermined language.

11. The webtoon content multilingual translation method according to claim 1, wherein the generating of the translated image in step (f) is performed by converting the adjusted translated text into an image file and overwriting a speech bubble region of an original webtoon image with the image file.

\* \* \* \* \*